United States Patent
Kim (10) Patent No.: US 7,986,309 B2
(45) Date of Patent: Jul. 26, 2011

(54) ELECTRONIC DEVICE WITH TOUCH SCREEN AND METHOD OF DISPLAYING INFORMATION USING THE SAME

(75) Inventor: Tae Hun Kim, Incheon (KR)

(73) Assignee: LG Electronics Inc., Seoul (KR)

( * ) Notice: Subject to any disclaimer, the term of this patent is extended or adjusted under 35 U.S.C. 154(b) by 902 days.

(21) Appl. No.: 11/778,882

(22) Filed: Jul. 17, 2007

(65) Prior Publication Data

US 2008/0174563 A1    Jul. 24, 2008

(30) Foreign Application Priority Data

Jan. 20, 2007   (KR) .................. 10-2007-0006383

(51) Int. Cl.
   *G06F 3/041*       (2006.01)
(52) U.S. Cl. ..... 345/173; 345/174; 345/179; 178/18.01; 178/18.05; 178/18.06; 178/18.07; 178/19.04; 463/37
(58) Field of Classification Search .................. 345/204, 345/173, 174–176, 179; 463/37; 715/800, 715/801, 815; 178/18.01–18.07, 19.01–19.04
See application file for complete search history.

(56) References Cited

U.S. PATENT DOCUMENTS

| | | | |
|---|---|---|---|
| 7,154,544 B2 | 12/2006 | Kowno et al. | |
| 2002/0093578 A1* | 7/2002 | Kowno et al. | 348/241 |
| 2003/0071858 A1* | 4/2003 | Morohoshi | 345/856 |
| 2005/0168488 A1* | 8/2005 | Montague | 345/659 |
| 2006/0026521 A1* | 2/2006 | Hotelling et al. | 715/702 |
| 2007/0152984 A1* | 7/2007 | Ording et al. | 345/173 |

FOREIGN PATENT DOCUMENTS

| | | |
|---|---|---|
| KR | 10-2006-0031114 | 4/2006 |
| KR | 10-2006-0076137 | 7/2006 |

* cited by examiner

*Primary Examiner* — Lun-yi Lao
*Assistant Examiner* — Olga Merkoulova
(74) *Attorney, Agent, or Firm* — Lee, Hong, Degerman, Kang & Waimey

(57) ABSTRACT

The present invention relates to displaying information on a touch screen of an electronic device. The present invention includes displaying information on a touch screen, sensing at least two points on the touch screen being touched, resizing the information displayed according to a distance between the at least two touched points, and displaying the resized information on the touch screen.

34 Claims, 5 Drawing Sheets

ELECTRONIC DEVICE WITH TOUCH SCREEN AND METHOD OF DISPLAYING INFORMATION USING THE SAME

CROSS-REFERENCE TO RELATED APPLICATIONS

Pursuant to 35 U.S.C. §119(a), this application claims the benefit of earlier filing date and right of priority to Korean Application No. 10-2007-0006383, filed on Jan. 20, 2007, the contents of which are hereby incorporated by reference herein in their entirety.

FIELD OF THE INVENTION

This present invention relates to an electronic device with a touch screen, and more particularly, to an electronic device with a touch screen capable of magnifying or reducing a size of an image displayed using device characteristics of the touch screen.

BACKGROUND OF THE INVENTION

In general, an electronic device with a touch screen allows a user to directly touch a touch screen to enter a desired menu or information, offering easy information accessibility.

However, in a related art electronic device with the touch screen, the user must manipulate a direction key to change the size of information displayed on the screen. Specifically, the direction key must be used to control a display magnification, such as when the user wishes to scale up or down the displayed information. Moreover, even when a function icon having a magnification function is provided at the touch screen of the related art electronic device to control the size of the displayed information, touching operations must be performed in two or more stages.

Thus, the related art electronic device with the touch screen is problematic because it fails to utilize device characteristics of the touch screen to change the size of displayed information.

SUMMARY OF THE INVENTION

The present invention is directed to displaying information on a touch screen of an electronic device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for displaying information on a touch screen of an electronic device, the method comprising displaying information on a touch screen, sensing at least two points on the touch screen being touched, resizing the information displayed according to a distance between the at least two touched points, and displaying the resized information on the touch screen.

Preferably, the information comprises at least one of image data, video data, map data, text data, and webpage data. In one aspect of the invention, the information is resized according to a comparison of the distance between the at least two touched points and a reference distance.

Preferably, the size of the information is enlarged when the distance between the at least two touched points is greater than the reference distance. Alternatively, the size of the information is uniformly enlarged for any distance between the at least two touched points greater than the reference distance. Alternatively, the size of the information is proportionally enlarged according to a ratio of the distance between the at least two touched points and the reference distance. In one aspect of the invention, the size of the information is proportionally enlarged discretely.

Preferably, the size of the information is reduced when the distance between the at least two touched points is lesser than a reference distance. Alternatively, the size of the information is uniformly reduced for any distance between the at least two touched points lesser than the reference distance. Alternatively, the size of the information is proportionally reduced according to a ratio of the distance between the at least two touched points and the reference distance. In one aspect of the invention, the size of the information is proportionally reduced discretely.

In another aspect of the invention, the information is resized according to a reference table in which a plurality of sizes are respectively matched to a plurality of distances between the at least two touched points. Preferably, the reference table is provided by the electronic device. Preferably, the plurality of sizes respectively matched to the plurality of distances in the reference table are determined by a user.

In one aspect of the invention, the reference distance is provided by the electronic device. Alternatively, the reference distance is determined by a user.

In accordance with the present invention, the method further comprises displaying an indicator for indicating the reference distance on the touch screen.

Preferably, the information is resized upon sensing the at least two points being touched N times within a certain time period, where N is an integer greater than 1. Preferably, the information is displayed on a portion of the touch screen and the at least two touched points are sensed on the entire touch screen. Alternatively, the information is displayed on a portion of the touch screen and the at least two touched points are sensed on the portion of the touch screen.

In accordance with another embodiment of the present invention, an electronic device for displaying information comprises a touch screen for displaying information and a controller for sensing at least two points on the touch screen being touched, resizing the information displayed according to a distance between the at least two touched points, and displaying the resized information on the touch screen.

Preferably, the information comprises at least one of image data, video data, map data, text data, and webpage data. In one aspect of the invention, the information is resized according to a comparison of the distance between the at least two touched points and a reference distance.

Preferably, the size of the information is enlarged when the distance between the at least two touched points is greater than the reference distance. Alternatively, the size of the information is uniformly enlarged for any distance between the at least two touched points greater than the reference distance. Alternatively, the size of the information is proportionally enlarged according to a ratio of the distance between the at least two touched points and the reference distance. In one aspect of the invention, the size of the information is proportionally enlarged discretely.

Preferably, the size of the information is reduced when the distance between the at least two touched points is lesser than a reference distance. Alternatively, the size of the information is uniformly reduced for any distance between the at least two touched points lesser than the reference distance. Alternatively, the size of the information is proportionally reduced according to a ratio of the distance between the at least two touched points and the reference distance. In one aspect of the invention, the size of the information is proportionally reduced discretely.

In another aspect of the invention, the information is resized according to a reference table in which a plurality of sizes are respectively matched to a plurality of distances between the at least two touched points. Preferably, the reference table is provided by the electronic device. Preferably, the plurality of sizes respectively matched to the plurality of distances in the reference table are determined by a user.

In one aspect of the invention, the reference distance is provided by the electronic device. Alternatively, the reference distance is determined by a user.

In accordance with the present invention, the touch screen displays an indicator for indicating the reference distance. Preferably, the information is resized upon the controller sensing the two points being touched N times within a certain time period, where N is an integer greater than 1.

Preferably, the information is displayed on a portion of the touch screen and the at least two touched points are sensed on the entire touch screen. Alternatively, the information is displayed on a portion of the touch screen and the at least two touched points are sensed on the portion of the touch screen.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to a method for displaying information on a touch screen of an electronic device. Hereinafter, preferred embodiments of the present invention will be described in detail with reference to the attached drawings.

In the present invention, various types of electronic devices with touch screens may be used. For example, the present invention may be applied to devices having touch screens such as a computer, a PDA, a mobile phone, and the like. An electronic device with a touch screen according to an embodiment of the present invention will now be described.

Figure 1:
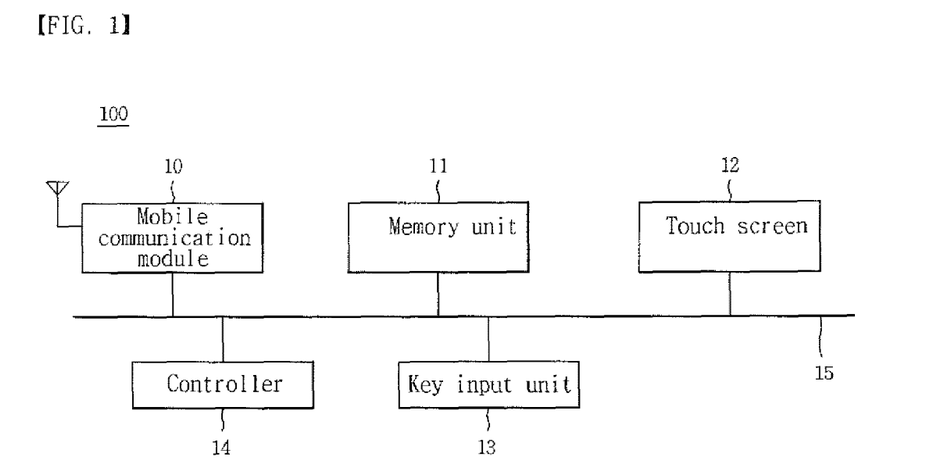
FIG. 1 is a block diagram illustrating an electronic device in accordance with one embodiment of the present invention.
Figure 2:
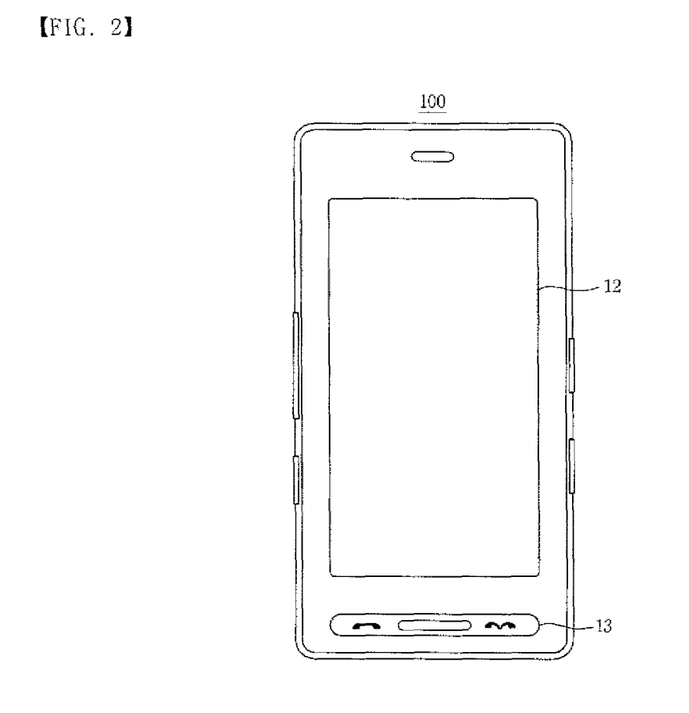
FIG. 2 is a drawing illustrating an exterior of a mobile terminal in accordance with one embodiment of the present invention.

FIG. 1 is a block diagram illustrating an electronic device in accordance with one embodiment of the present invention. FIG. 2 is a drawing illustrating an exterior of a mobile terminal in accordance with one embodiment of the present invention.

Referring to FIG. 1, an electronic device 100 with a touch screen comprises a mobile communication module 10, a memory unit 11, a touch screen 12, a key input unit 13, and a controller 14. The respective elements are connected by a bus 15. Preferably, the mobile communication module 10 is a wireless communication device for transmitting and receiving data to and from a mobile communication network. For example, a call or message can be transmitted and received through the mobile communication module 10.

The memory unit 11 stores programs for controlling a general operation of the electronic device 100, data inputted and outputted during general operation of the electronic device 100, and various processed data. In particular, the memory unit 11 may store various types of information, such as video data, image data, and text data, which can be displayed on the touch screen 12.

The touch screen 12 performs two types of functions. During a display function, the touch screen 12 may display a state of the electronic device 100 and various types of information via a control signal outputted from the controller 14. During an input function, the touch screen 12 may receive various information or commands from a user.

The key input unit 13 serves to receive various information and commands from the user. Preferably, the key input unit 13 comprises at least one key having a specific function, such as a function for inputting a number or direction. The controller 14 controls the above-described elements and general operation of the electronic device according to the present invention.

In addition to the above-described elements, the electronic device 100 with the touch screen may also include at least one of a broadcast reception module for receiving a broadcast signal from a broadcasting network, a communication module for communicating with the wireless Internet, a camera module, a vibration module for generating vibration, and various sensors.

Figure 3:
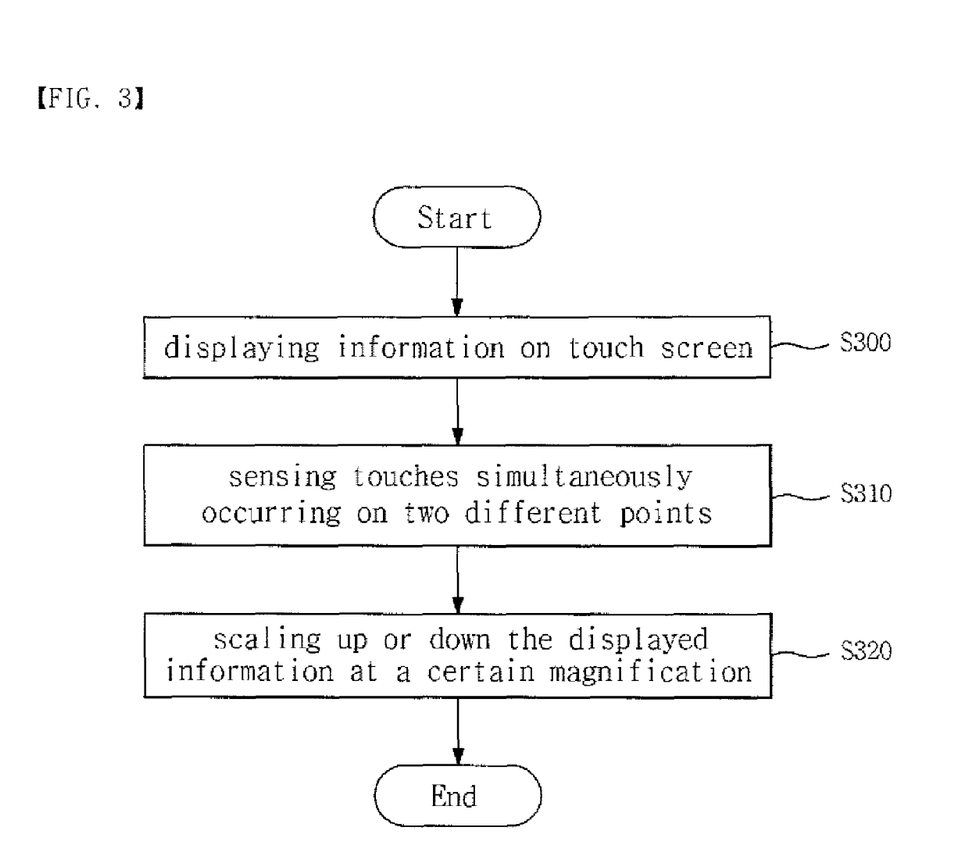
FIG. 3 is a flow chart illustrating a method of displaying information using an electronic device with a touch screen in accordance with one embodiment of the present invention.
Figure 4:
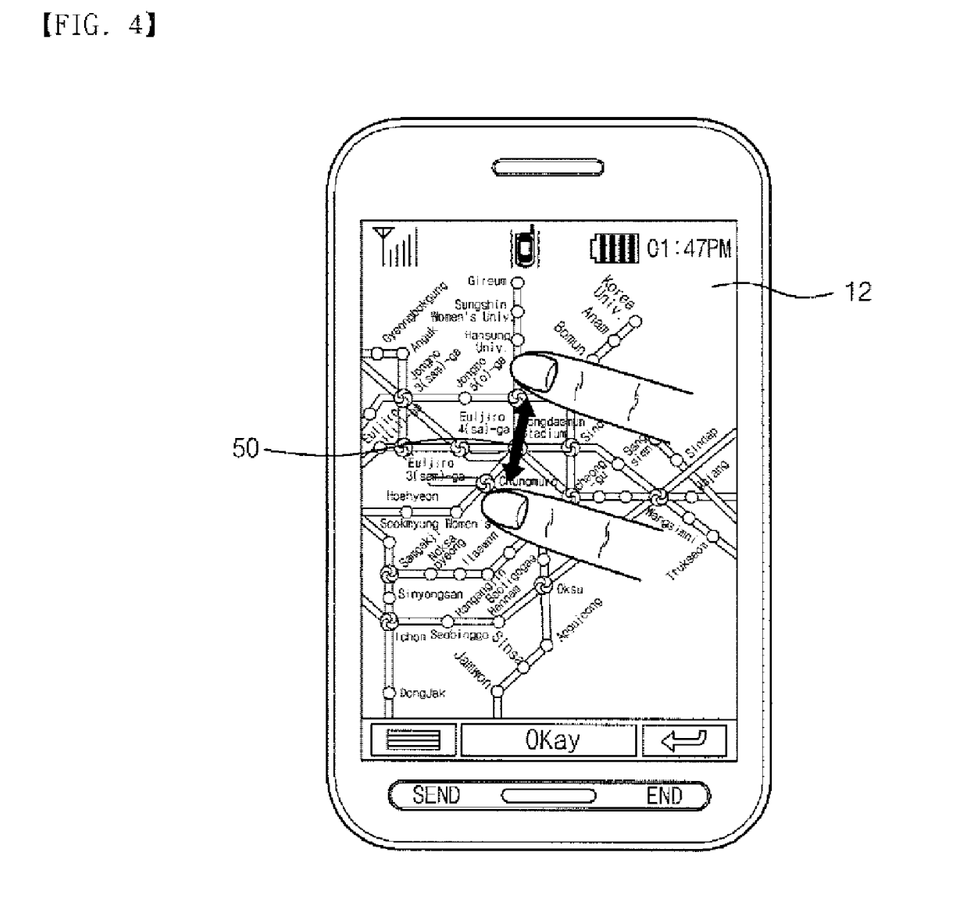
FIG. 4 is a drawing illustrating two particular points on a touch screen being simultaneously touched in accordance with one embodiment of the present invention.
Figure 5:
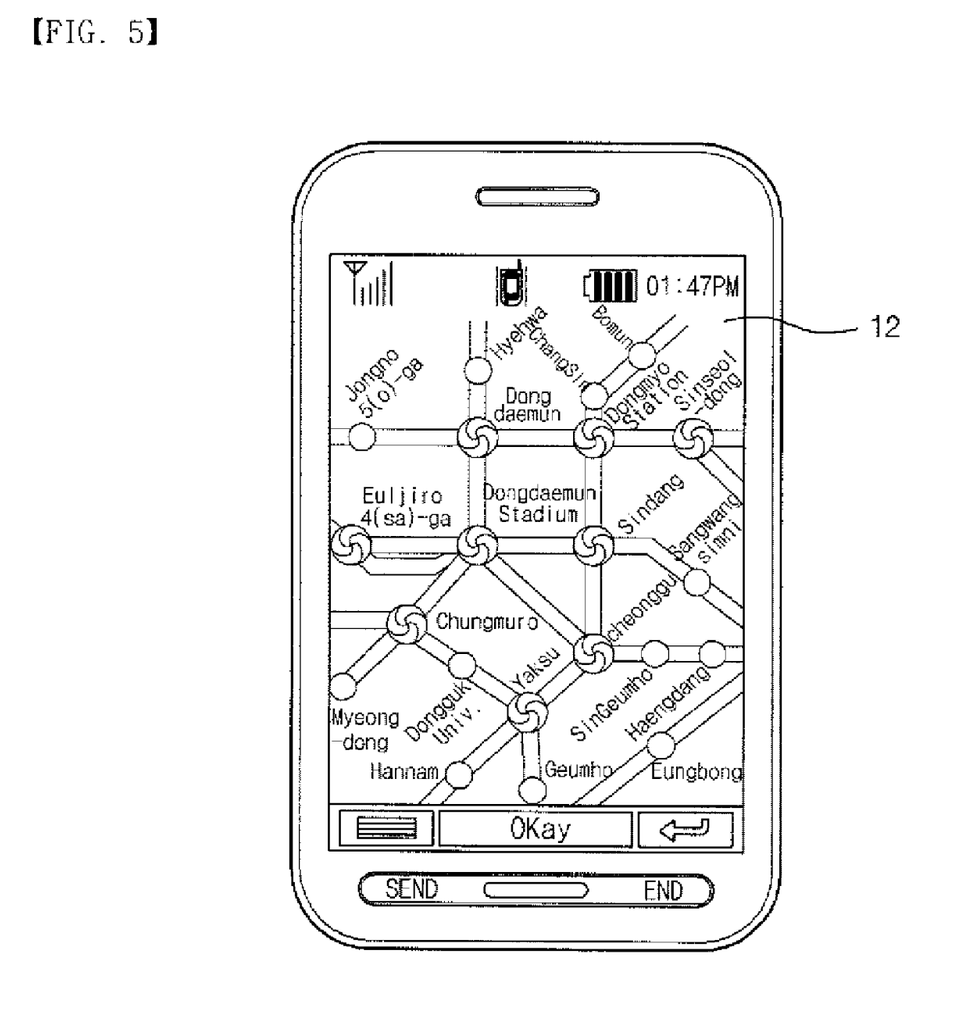
FIG. 5 is a drawing illustrating a magnified screen image of a subway line map of FIG. 4 in accordance with one embodiment of the present invention.
Figure 6:
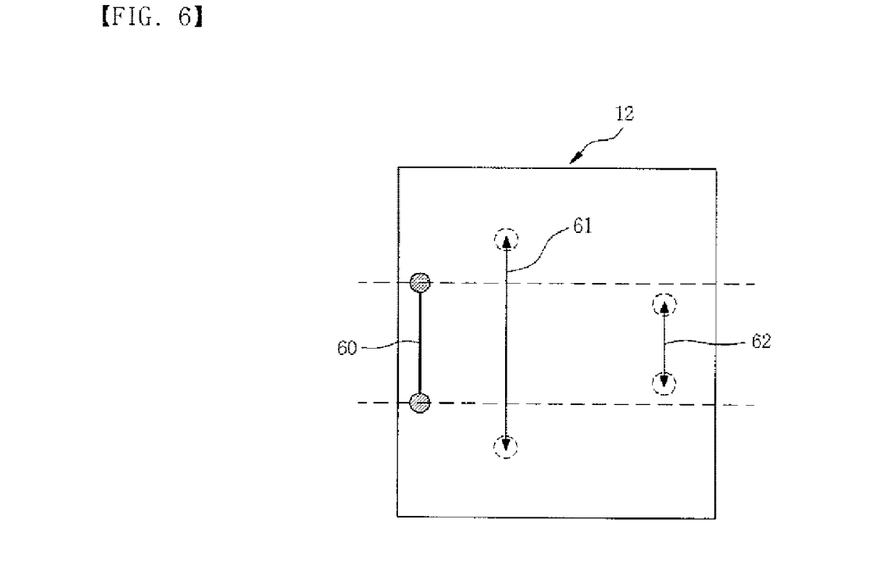
FIG. 6 is a drawing illustrating a comparison between a reference distance and a touch distance in accordance with one embodiment of the present invention.
Figure 7:
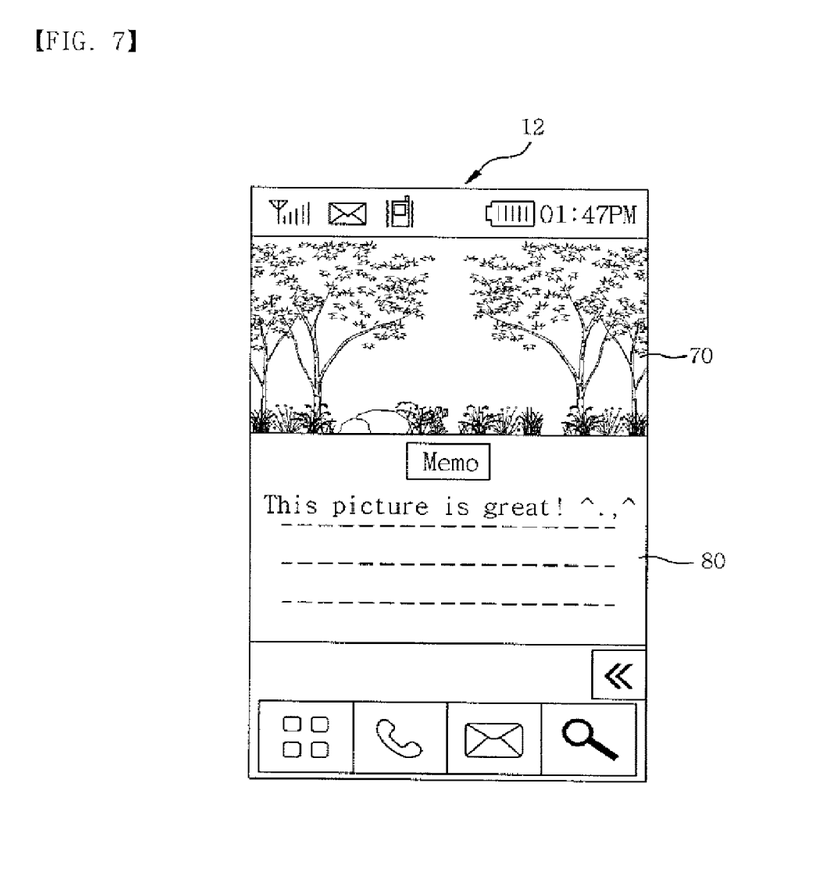
FIG. 7 is a drawing of a screen image showing a multitasking function being performed in accordance with one embodiment of the present invention.

A method of displaying information using the electronic device with the touch screen according to one embodiment of the present invention can be performed in the electronic device 100 as described above with reference to FIG. 1. FIG. 3 is a flow chart illustrating a method of displaying information using the electronic device with the touch screen in accordance with one embodiment of the present invention. FIG. 4 is a drawing illustrating two particular points being simultaneously touched on the touch screen in accordance with one embodiment of the present invention. FIG. 5 is a drawing illustrating a magnified screen image of a subway line map of FIG. 4 in accordance with one embodiment of the present invention. FIG. 6 is a drawing illustrating a comparison between a reference distance and a touch distance in accordance with one embodiment of the present invention. FIG. 7 is a drawing of a screen image showing a multitasking function being performed in accordance with one embodiment of the present invention. The electronic device with the touch screen and the method of displaying information using the same according to preferred embodiments of the present invention will now be described in detail.

Referring to FIG. 3, the touch screen 12 displays particular information according to a control signal of the controller 14 (S300). It is contemplated that the particular information may comprise all types of information capable of being displayed on the touch screen 12. For example, the particular information may include image data, text data, video data, animated data, etc. In addition, if a particular Web page is connected through the Internet, various information provided by the particular Web page may be displayed on the touch screen 12, for example. Referring to FIG. 4, a subway line map is displayed on the touch screen 12.

In one aspect of the invention, the controller 14 may display information such that the information is displayed only on a portion of an entire displayable region of the touch screen 12. For example, the controller 14 may not display information on a region of the touch screen 12 reserved for displaying an indicator for indicating a current state of the electronic device 100. In the indicator region, at least one of the following is preferably displayed: an indicator indicating strength of a radio signal received through the mobile communication module 10, an indicator indicating reception of a message, an indicator indicating whether or not vibration has been set, an indicator indicating a remaining battery capacity, and a current time. As shown in FIG. 4, the subway line map is not displayed in the indicator region.

In accordance with the present invention, the controller 14 senses when two different points on the touch screen 12 are simultaneously touched (S310 of FIG. 3). Hereinafter, the two different points will be referred to as "point A" and "point B". Moreover, the event occurring when the two different points are simultaneously touched will be referred to as a "simultaneous touch". As shown in FIG. 4, a simultaneous touch occurs when a user touches two particular points on the subway line map displayed on the touch screen 12 with two fingers.

In accordance with the present invention, the simultaneous touch is not limited to when the point A and the point B are touched exactly at the same time. It is contemplated that the simultaneous touch may also occur when the point A is first touched, and the point B is subsequently touched within a certain time while the point A remains touched. The two different points may be touched one time or N number of times within a certain time period, wherein "N" is an integer greater than 1.

In accordance with the present invention, the controller 14 scales up or down the size of the information displayed on the touch screen 12 at a certain magnification determined according to a distance between the two touched points. Hereinafter, the distance between the two touched points will be referred to as a "touch distance". For example, when the user simultaneously touches two points as shown in FIG. 4, the image of the subway line map is magnified as displayed on the touch screen 12 of FIG. 5.

The magnification may be determined by comparing a reference distance and the touch distance. For example, when the touch distance is greater than the reference distance, the magnification is determined to be greater than 1. When the touch distance is less than the reference distance, the magnification is determined to be less than 1.

The reference distance and the touch distance may be measured by various units, and compared by the measured units. For example, a unit of the reference distance and the touch distance may be a pixel unit or a unit of weights and measures. Preferably, the unit of the reference distance and the touch distance includes every unit recognized and processed by the controller 14.

Referring to FIG. 6, reference numeral 60 denotes a reference distance. Reference numeral 61 denotes a touch distance for magnifying and displaying the information. Reference numeral 62 denotes a touch distance for reducing and displaying the information.

In accordance with one embodiment of the present invention, the degree of magnification is respectively uniform when the touch distance is greater or lesser than the reference distance. For example, as shown in FIG. 6, if a touch distance for magnifying the displayed information is greater than the touch distance denoted by the reference numeral 61, the degree of magnification is the same as the degree of magnification associated with the touch distance denoted by the reference numeral 61. Similarly, if the touch distance for reducing the displayed information is less than the touch distance denoted by the reference numeral 62, the degree of reduced magnification is the same as the degree of reduced magnification associated with the touch distance denoted by the reference numeral 62.

In accordance with another embodiment of the present invention, the degree of magnification corresponds to a ratio between the reference distance and the touch distance. For example, as shown in FIG. 6, if the touch distance for magnifying the displayed information is greater than the touch distance denoted by the reference numeral 61, the degree of magnification is proportionally greater than the degree of magnification associated with the touch distance denoted by the reference numeral 61. Similarly, if the touch distance for reducing the displayed information is less than the touch distance denoted by the reference numeral 62, the reduced magnification is proportionally less than the degree of reduced magnification associated with the touch distance denoted by the reference numeral 62.

In accordance with another embodiment of the present invention, the degree of magnification is directly proportional to a ratio between the touch distance and the reference distance, or corresponds to a ratio between the reference distance and the touch distance. Namely, the magnification is determined stepwise according to the ratio of the touch distance to the reference distance. For example, if the reference distance is 1.5 cm, and the touch distance is within the range of 1.5 cm to 2.5 cm, then the magnification is 2. If the touch distance is within the range of 2.5 cm to 3.5 cm, then the magnification is 3.

In accordance with another embodiment of the present invention, the degree of magnification may not be necessarily determined according to the above-described manner. For example, the memory unit 11 may store a table in which a plurality of magnifications are respectively matched to a plurality of touch distances. Hence, the degree of magnification is determined with reference to the table stored in the memory unit 11. In one aspect of the invention, the controller 14 may calculate the touch distance by using coordinate values of the points A and B transferred from the touch screen 12. The controller 14 may then scale up or down the information displayed on the touch screen 12 according to the magnification matched to the calculated touch distance in the stored table.

In accordance with the present invention, the controller 14 displays a mark (or sign) indicating the reference distance on the touch screen 12. Upon seeing the mark indicating the reference distance, the user may recognize at which distance the two points are to be touched in order to scale up or down the displayed information.

The mark indicating the reference distance can be displayed on the touch screen 12 in various forms. For example, the mark indicating the reference distance can be displayed as denoted by the reference numeral 60 in FIG. 6. In this case, the controller 14 may control such that the mark denoted by the reference numeral 60 in FIG. 6 is transparent in an OSD (On Screen Display) type on the information displayed on the touch screen 12.

In addition, for example, the mark indicating the reference distance may be displayed on a certain region of the touch screen 12 in text form, such as "C=2 cm". The mark indicating the reference distance may also be displayed in the form of an image or icon.

Referring to FIG. 7, scaling up or down the size of information displayed on a certain region of the touch screen 12 will now be described in accordance with one embodiment of the present invention. In FIG. 7, a particular image is displayed in a first region 70 and a screen image for creating a memo is displayed in a second region 80. That is, in FIG. 7, the electronic device 100 is in a multitasking mode in which an application for providing the image displaying function and an application for providing a memory creating function are simultaneously performed.

In this state, it is assumed that the user wants to scale up the size of the particular image displayed in the first region 70. Accordingly, the user may simultaneously touch two different points existing within the first region 70 to scale up the particular image, or may simultaneously touch two different points existing within the entire displayable region of the touch screen 12 without discriminating the first region 70 and the second region 80.

In accordance with the present invention, when information displayed on a portion of an entire region of the touch screen 12 is intended to be scaled up or down, the two different touch points according to the preferred embodiments of the present invention may exist within the entire region or within the portion of the entire region. The discrimination of the regions for performing the process S320 of FIG. 3 may be set or changed by the user.

In accordance with the present invention, the number of required touches in the process S310 of FIG. 3 to perform the process S320 of FIG. 3 can be set or changed variably. For example, assuming that the number of touches is set as "N" ("N" is an integer greater than or equal to 1), if a touch event with respect to the points A and B transferred from the touch screen 12 occurs by the pre-set N number of times, the controller 14 scales up or down the displayed information according to a magnification determined by the touch distance between the points A and B.

As described above, the electronic device with the touch screen and the method of displaying information using the same is advantageous because the size of the information displayed can be conveniently scaled up or down by using the device characteristics of the touch screen.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for displaying information on a touch screen of an electronic device, the method comprising:
    storing a reference distance in a memory unit of the device;
    displaying information on the touch screen;
    displaying an indicator indicating the stored reference distance;
    sensing an input for resizing the displayed information when two points on the touch screen are initially touched simultaneously or substantially at the same time;
    determining a distance between the two touched points;
    resizing the information responsive to the input based on the determined distance and the reference distance; and
    displaying the resized information on the touch screen.

2. The method of claim 1, wherein the information comprises at least one of:
    image data;
    video data;
    map data;
    text data; or
    webpage data.

3. The method of claim 1, wherein a size of the information is uniformly enlarged regardless of the distance when the distance between the two touched points is greater than the reference distance.

4. The method of claim 1, wherein a size of the information is proportionally enlarged according to a ratio of the distance between the two touched points and the reference distance.

5. The method of claim 4, wherein the size of the information is proportionally enlarged discretely.

6. The method of claim 1, wherein a size of the information is uniformly reduced regardless of the distance when the distance between the two touched points is lesser than the reference distance.

7. The method of claim 1, wherein a size of the information is proportionally reduced according to a ratio of the distance between the two touched points and the reference distance.

8. The method of claim 7, wherein the size of the information is proportionally reduced discretely.

9. The method of claim 1, wherein the information is enlarged or reduced according to a reference table in which a plurality of distances between the touched two points are respectively matched to a plurality of magnifications.

10. The method of claim 9, wherein the reference table is provided by the electronic device.

11. The method of claim 9, wherein the plurality of magnifications respectively matched to the plurality of distances between the touched two points in the reference table are determined by a user.

12. The method of claim 1, wherein the stored reference distance is set by the electronic device.

13. The method of claim 1, wherein the stored reference distance is set by a user.

14. The method of claim 1, wherein the information is resized upon sensing the two points being touched N times within a certain time period, where the N is an integer greater than 1.

15. The method of claim 1, wherein the information is displayed on a portion of the touch screen and the two touched points are sensed on the portion of the touch screen.

16. An electronic device, comprising:
    a memory unit configured to store a reference distance;
    a touch screen configured to display information and an indicator indicating the stored reference distance; and
    a controller configured to:
        sense an input for resizing the displayed information when two points on the touch screen are initially touched simultaneously or substantially at the same time;
        determine a distance between the two touched points;

resize the information responsive to the input based on the determined distance and the reference distance; and cause displaying of the resized information on the touch screen.

17. The electronic device of claim 16, wherein the information comprises at least one of:
   image data;
   video data;
   map data;
   text data; or
   webpage data.

18. The electronic device of claim 16, wherein a size of the information is uniformly enlarged regardless of the distance when the distance between the two touched points is greater than the reference distance.

19. The electronic device of claim 16, wherein a size of the information is proportionally enlarged according to a ratio of the distance between the two touched points and the reference distance.

20. The electronic device of claim 19, wherein the size of the information is proportionally enlarged discretely.

21. The electronic device of claim 16, wherein a size of the information is uniformly reduced regardless of the distance when the distance between the two touched points is lesser than the reference distance.

22. The electronic device of claim 16, wherein a size of the information is proportionally reduced according to a ratio of the distance between the two touched points and the reference distance.

23. The electronic device of claim 22, wherein the size of the information is proportionally reduced discretely.

24. The electronic device of claim 16, wherein the information is enlarged or reduced according to a reference table in which a plurality of distances between the touched two points are respectively matched to a plurality of magnifications.

25. The electronic device of claim 24, wherein the reference table is provided by the electronic device.

26. The electronic device of claim 24, wherein the plurality of magnifications respectively matched to the plurality of distances between the touched two points in the reference table are determined by a user.

27. The electronic device of claim 16, wherein the stored reference distance is provided by the electronic device.

28. The electronic device of claim 16, wherein the stored reference distance is determined by a user.

29. The electronic device of claim 16, wherein the information is resized upon the controller sensing the two points being touched N times within a certain time period, where the N is an integer greater than 1.

30. The electronic device of claim 16, wherein the information is displayed on a portion of the touch screen and the two touched points are sensed on the portion of the touch screen.

31. A method for displaying information on a touch screen of an electronic device, the method comprising:
   storing a reference distance in a memory of the device;
   displaying information and an indicator indicating the stored reference distance;
   sensing an input for resizing the displayed information when two points on the touch screen are initially touched simultaneously or substantially at the same time;
   enlarging the displayed information when a distance between the initially touched two points is greater than the reference distance indicated by the indicator;
   reducing the displayed information when the distance between the initially touched two points is less than the reference distance indicated by the indicator; and
   displaying the enlarged or reduced information on the touch screen.

32. A method for displaying information on a touch screen of an electronic device, the method comprising:
   storing a reference distance in a memory of the device;
   displaying first information and second information, which is different from the first information, distinguishably on a first region and a second region of the touch screen, respectively;
   displaying an indicator indicating the stored reference distance;
   sensing an input for resizing the displayed first information when two points on the entire touch screen are initially touched simultaneously or substantially at the same time;
   enlarging the first information displayed on the first region when a distance between the initially touched two points is greater than the stored reference distance;
   reducing the first information displayed on the first region when the distance between the initially touched two points is less than the stored reference distance; and
   displaying the enlarged or reduced first information on the first region of the touch screen.

33. An electronic device, comprising:
   a memory configured to store a reference distance;
   a touch screen configured to display information and an indicator indicating the stored reference distance; and
   a controller configured to:
      sense an input for resizing the displayed information when two points on the touch screen are initially touched simultaneously or substantially at the same time;
      enlarge the displayed information when a distance between the initially touched two points is greater than the reference distance indicated by the indicator;
      reduce the displayed information when the distance between the initially touched two points is less than the reference distance indicated by the indicator; and
      display the enlarged or reduced information on the touch screen.

34. An electronic device, comprising:
   a memory configured to store a reference distance;
   a touch screen configured to display first information and second information, which is different from the first information, distinguishably on a first region and a second region of the touch screen, respectively, the touch screen further displaying an indicator indicating the stored reference distance; and
   a controller configured to:
      sense an input for resizing the displayed first information when two points on the entire touch screen are initially touched simultaneously or substantially at the same time;
      enlarge the first information displayed on the first region when a distance between the initially touched two points is greater than the stored reference distance;
      reduce the first information displayed on the first region when the distance between the initially touched two points is less than the stored reference distance; and
      display the enlarged or reduced first information on the first region of the touch screen.

* * * * *